United States Patent [19]

Ohashi

[11] Patent Number: 4,911,145
[45] Date of Patent: Mar. 27, 1990

[54] VACUUM TYPE SOLAR HEAT COLLECTING APPARATUS

[75] Inventor: Kiyoshi Ohashi, Shiga, Japan

[73] Assignee: Nippon Denki Garasu Kabushiki Kaisha, Otsu, Japan

[21] Appl. No.: 284,852

[22] Filed: Dec. 13, 1988

Related U.S. Application Data

[63] Continuation of Ser. No. 13,108, Feb. 10, 1987, abandoned.

[30] Foreign Application Priority Data

Feb. 18, 1986 [JP]  Japan .................................. 61-30162
Jan. 26, 1987 [JP]  Japan .................................. 62-16424

[51] Int. Cl.⁴ ................................................. F24J 3/02
[52] U.S. Cl. .................................... 126/443; 126/419; 126/432
[58] Field of Search ............... 126/432, 418, 419, 443; 137/614.2

[56] References Cited

U.S. PATENT DOCUMENTS

| | | | |
|---|---|---|---|
| 1,068,650 | 7/1913 | Harrison | 126/443 X |
| 3,387,622 | 6/1968 | Weinstein | 137/614.2 X |
| 3,993,361 | 11/1976 | Stelzer | 137/614.2 X |
| 4,080,954 | 3/1978 | De Wilde et al. | 126/443 |
| 4,119,085 | 10/1978 | Knowles et al. | 126/443 X |
| 4,205,655 | 6/1980 | Hunt | 126/443 |
| 4,211,211 | 7/1980 | Toomey et al. | 126/443 X |
| 4,262,658 | 4/1981 | Frissora | 126/443 |
| 4,299,200 | 11/1981 | Spencer | 126/434 |
| 4,396,007 | 8/1983 | Siemiller | 126/432 |
| 4,399,808 | 8/1983 | Frissora et al. | 126/443 X |
| 4,452,233 | 6/1984 | Goodman, Jr. et al. | 126/443 |
| 4,649,903 | 3/1987 | Takeuchi et al. | 126/443 |
| 4,674,478 | 6/1987 | Liebard | 126/443 |

FOREIGN PATENT DOCUMENTS

| | | | |
|---|---|---|---|
| 2933511 | 3/1980 | Fed. Rep. of Germany | |
| 2444237 | 8/1980 | France | 126/443 |
| 10651 | 2/1981 | Japan | 126/443 |
| 169550 | 10/1982 | Japan | 126/443 |
| 52933 | 3/1983 | Japan | 126/443 |
| 0063455 | 4/1984 | Japan | 126/443 |
| 0071853 | 4/1985 | Japan | 126/443 |

Primary Examiner—Carl D. Price
Attorney, Agent, or Firm—Armstrong, Nikaido, Marmelstein, Kubovcik & Murray

[57] ABSTRACT

A vacuum type solar heat collecting apparatus comprising a transparent, elongated cylindrical glass container sealed at one end and opening at the other end which is reduced in diameter, a cylindrical metal water-reservoir sealed at one end and opening at the other end which is reduced in diameter, and being coaxially disposed in the glass container through supporters, the outer surface of the water-reservoir being coated with a selective absorption film, a first elongated pipe extending to the vicinity of the sealed end in the water-reservoir through the open ends of the glass container and water-reservoir, a second short pipe extending through the open end of the container for connection to the open end of the reservoir, and a sealing metal fixture which seals the opening part of small diameter of the glass container, wherein space between the glass container and the water-reservoir is kept in vacuum, and water is fed into the water-reservoir through either of the first pipe and second pipe, and is stored to collect heat in the water-reservoir, being taken out as hot water.

7 Claims, 3 Drawing Sheets

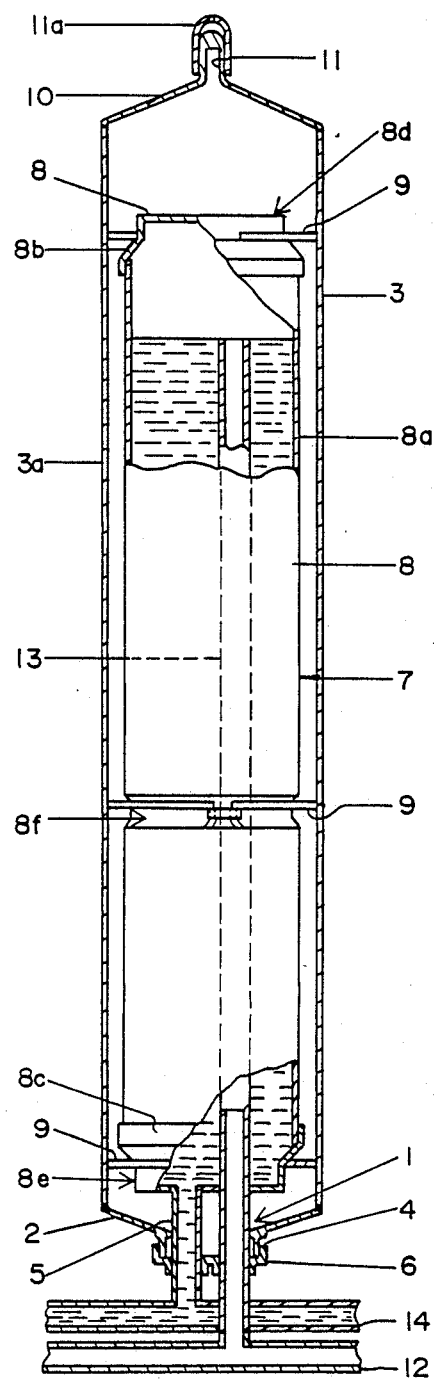
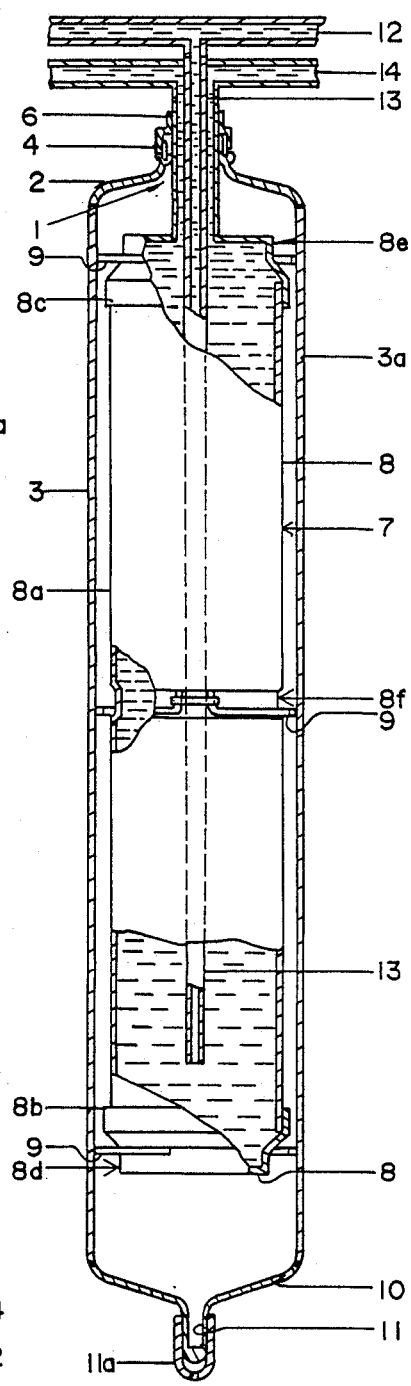

VACUUM TYPE SOLAR HEAT COLLECTING APPARATUS

This application is a continuation of application Ser. No. 013,108 filed Feb. 10, 1987 now abandoned.

BACKGROUND OF THE INVENTION

The present invention relates to a vacuum type solar heat collecting apparatus wherein a cylindrical water-reservoir is disposed in a glass container.

The conventional vacuum type solar heat collecting apparatuses which are generally used have a construction that a thin heat collecting pipe having a heat collecting plate is disposed in a transparent outer pipe whose interior is kept in vacuum, and a depression is installed at the center part of the heat collecting plate, and a heat collecting pipe which is a passage for a medium such as water is fitted into this depression.

The above-mentioned solar heat collecting apparatuses having the conventional construction have problems such that they are likely to produce loss of heat conduction from the heat collecting plate to the heat collecting pipe. The heat conduction loss is increased particularly when a relative movement or separation takes place. Incident energy is decreased due to a large loss in quantity of light when the solar light plunges obliquely into the heat collecting plate. The heat collecting pipe is thin and the amount of medium which can be heated at a time is limited. Therefore, another hot water storage tank has to be employed. The hot water feeding installation becomes expensive and much labor is taken for installation thereof.

This means that in the above-mentioned conventional hot water feeding installation, a circulating pump or the like is required for raising the temperature of hot water in the hot water storage tank by circulating water between the hot water storage tank and the heat collecting pipe. This requires an adiabatic construction dedicated to decreasing heat dissipation from the hot water storage tank and the circulating path.

Also, the conventional hot water feeding installations have a problem that when the heat collecting pipe is replenished with new water, the new water is mixed immediately with hot water in the heat collecting pipe, reducing the temperature of the hot water.

The present invention is performed in the light of the above-mentioned, and an apparatus of the present invention comprises a transparent long cylindrical glass container one end of which is sealed tightly and the other end of which is narrowed in a small diameter and opened. A cylindrical metal water-reservoir one end of which is sealed tightly and the other end of which is narrowed in a small diameter and opened, and disposed in the above-mentioned glass container in a coaxial fashion through supporters. The outer surface of the metal reservoir is coated with a selective absorption film. A first long pipe is inserted into the vicinity of the sealed end in the water-reservoir in a manner of penetrating the open ends of the above-mentioned glass container and water-reservoir. A second short pipe which is connected to the open end of the water-reservoir in a manner of penetrating the open end of the above-mentioned glass container. A sealing metal fixture seals the opening part of small diameter of the above-mentioned glass container. The space between the above-mentioned glass container and water-reservoir is kept in vacuum. Water is fed into the water reservoir through either of the above-mentioned first pipe and second pipe, and is stored and collects heat in the water-reservoir, being taken as hot water.

The present invention comprises the case where the open ends of the above-mentioned glass container and water-reservoir are disposed lower than the sealed ends thereof. Water is fed into the water-reservoir through the second pipe. Hot water is taken out of the water-reservoir through the first pipe or the second pipe. In the case where the above-mentioned open ends are disposed higher than the sealed ends thereof, water is fed into the water-reservoir through the first pipe, and hot water is taken out of the water-reservoir through the second pipe.

The present invention comprises also the case where the diameter of the second pipe is made larger than that of the first pipe to provide a gap around the outer periphery of the first tube and both pipes are disposed in a coaxial fashion, and the case where the first pipe and the second pipe are disposed in a parallel fashion.

Furthermore, the water-reservoir in accordance with the present invention comprises a configuration wherein outer peripheral parts of small diameter are provided at the both ends thereof and proper intermediate position, and the water-reservoir is disposed in the glass container in a coaxial fashion through supporters attached to these outer peripheral parts of small diameter.

Also the water-reservoir in accordance with the present invention comprises a configuration comprising a metal cylinder which has openings at opposite ends thereof and has a uniform diameter except for the intermediate portions where the supporters are attached and a metal cap jointed to the opposite ends of the cylinder.

Also, the present invention comprises a configuration wherein a plurality of glass containers having the water-reservoir therein are employed, and are connected to a first header pipe and a second heater pipe, respectively, in a parallel fashion through the first pipe and the second pipe.

Furthermore, the present invention comprises also a configuration wherein the header pipe of the water feed side is connected directly to a water feed pressure source, such as water service, through a reduced pressure check valve, and the header pipe at the hot water side is connected to a hot water feed pipe having a hot water feed stopcock.

In a vacuum type solar heat collecting apparatus in accordance with the present invention, the cylindrical metal water-reservoir disposed in the glass container has an outer diameter close to the inner diameter of the glass container, and is as sufficiently large to occupy a volume which is at least 60% or more of the inner volume of the glass container, and a large amount of water is stored therein. Then, the solar heat transmitted through the transparent glass container is collected in the metal water-reservoir through a selective absorption film. The heat collected in the metal water-reservoir is prevented from dissipation due to heat conduction toward the outside by a vacuum adiabatic action, and heats water in the water-reservoir. The temperature of the whole water in the above-mentioned water-reservoir is raised because the portion whose specific gravity becomes smaller due to warm-up by solar heat moves to the upper portion in the water-reservoir and natural circulation takes place in the water-reservoir.

In one embodiment in accordance with the present invention, the water pressure from the water feed pressure source, such as water service, is reduced to an appropriate pressure and acts through the reduced pressure check valve in each water-reservoir, the first and the second header pipes and the hot water feed pipe. When the hot water feed stopcock connected to the hot water feed pipe is opened, hot water in each water-reservoir is taken out and water of an amount equal to this discharge is fed from the water feed pressure source such as water service.

In the vacuum type solar heat collecting apparatus in accordance with the present invention, in the case where the open ends of the glass container and the water-reservoir are disposed lower than the sealed ends thereof and the apparatus is installed on the roof of a building or the like, water is fed into the water-reservoir through the second pipe from the second heater pipe connected directly to the water feed pressure source, such as water service, through the reduced pressure check valve. In this case, air in the water-reservoir goes outside, via the first pipe and the first header pipe and through an automatic air discharge valve attached to the end of the first header pipe, or the like, to be replaced by the water to be fed. The water level of the stored water in the water-reservoir is determined by the length of insertion of the first pipe. Therefore, the first pipe is inserted into the vicinity of the sealed end of the water-reservoir and the water level of the stored water is raised. The hot water in the water-reservoir is taken out via the first pipe and the first header pipe and through the hot water feed pipe connected thereto. In this case, when hot water in the water-reservoir is fed from the bottom part thereof, so as not to stir through the second header pipe disposed at the lower side of inclination and the second pipe, only hot water is taken out effectively because the hot water is pushed upward due to a difference of specific gravity between cold water and hot water. Water of an amount equal to that of the hot water taken out is fed from the second header pipe through the second pipe.

Hot water is taken out also by another method, wherein hot water is taken out from the second pipe via the second header pipe. In this case, one end of the second header pipe is connected to the water feed source, through an automatic or manual open/close valve, and the other end thereof is connected to the hot water feed pipe, or the second header pipe is connected in a manner capable of switching operation to the water feed pipe or to the hot water feed pipe through a three-way switching cock. In this case, the role of the first pipe and the first header pipe is too function as an inlet or an outlet of air in the waterreservoir, a water discharge port at overflow, or a relief port of an increased inner pressure.

Next, in the case where the apparatus is installed on the roof of a building, or the like, with the open ends of the glass container and the water-reservoir disposed higher than the sealed ends there, water is fed into the water-reservoir through the first pipe from the first header pipe connected directly to the water feed pressure source, such as water service, through the reduced pressure check valve. In this case, the water level of the stored water in the water-reservoir is raised fully independent of the length of insertion of the first pipe and, therefore, an increase in the amount of stored water is expected. In this case, the second pipe and the second header pipe act as a take-out port of hot water, and functions as an inlet or outlet of air, a relief port of an increased pressure, or a port for discharging a volume increment of hot water due to a rise in temperature and, for this reason, the hot water feed pipe, a safety valve, the automatic air discharge valve and the like are connected thereto. The inserted end of the above-mentioned first tube is disposed close to the vicinity of the sealed end of the water-reservoir. Stirring and mixing of hot water are suppressed. Furthermore, by forming an expansion chamber, or a diffuser, or calmly converting the velocity energy of fed water into the pressure energy in the vicinity of the inserted end, hot water can be taken out more efficiently.

In accordance with the vacuum type solar heat collecting apparatus of the present invention, a large quantity of water can be warmed at a time and in the case of use as a hot water storage system, the water-reservoir can be utilized as a hot water storage tank. Another hot water storage tank can be dispensed with and the initial cost of this type of apparatus can be reduced.

By making the water-reservoir with metal breakage due to thermal shock can be eliminated and required pressure-resisting strength can be maintained with light weight.

By narrowing the open and sides of the glass container and the metal water-reservoir in a small diameter, the area of seal of the open end of the glass container by the sealing fixture can be reduced and the probability of vacuum leakage of the interior can be reduced to a great extent. The expensive glass sealing fixture can be made in a smaller diameter and, by making the diameter of the metal portion having a heat conductivity larger than that of glass smaller, the heat loss from the sealing fixture can be reduced. The light receiving part is widened by a larger transparent glass portion and heat collecting efficiently is improved.

As mentioned above, the present invention enables the open ends of the glass container and the water-reservoir to be used in an upsidedown fashion. Therefore, the members can be used in common in the system wherein the open ends of the glass container and the water-reservoir are disposed lower than the sealed ends thereof and in the system wherein the open ends are disposed higher. Accordingly the present invention is advantageous for controlling production and inventory.

In one embodiment in accordance with the present invention, the header pipe of the water feed side is connected directly to the water feed pressure source through the reduced pressure check valve. The header pipe of the side of taking out hot water is connected to the hot water feed pipe having the hot water feed stopcock. Hot water can be taken out by only opening the hot water feed stopcock and, at the same time, water of an amount equal to that of the hot water taken out is fed in the water-reservoir. A special water feed controlling apparatus or the like can be dispensed with. Furthermore, needless to say, back flow of hot water can be prevented and the pressure in the hot water feeding installation can be kept at a predetermined vale. No no adverse effect is given to the pressure resisting property of the water-reservoir, pipe connecting parts and the like.

BRIEF DESCRIPTION OF THE DRAWINGS

FIG. 4 is a longitudinal cross-sectional view of the vacuum type solar heat collecting apparatus showing a modified example of the first embodiment.

FIG. 5 is a longitudinal cross-sectional view of the vacuum type solar heat collecting apparatus showing a second embodiment in accordance with the present invention.

DESCRIPTION OF THE PREFERRED EMBODIMENTS

Figure 1:
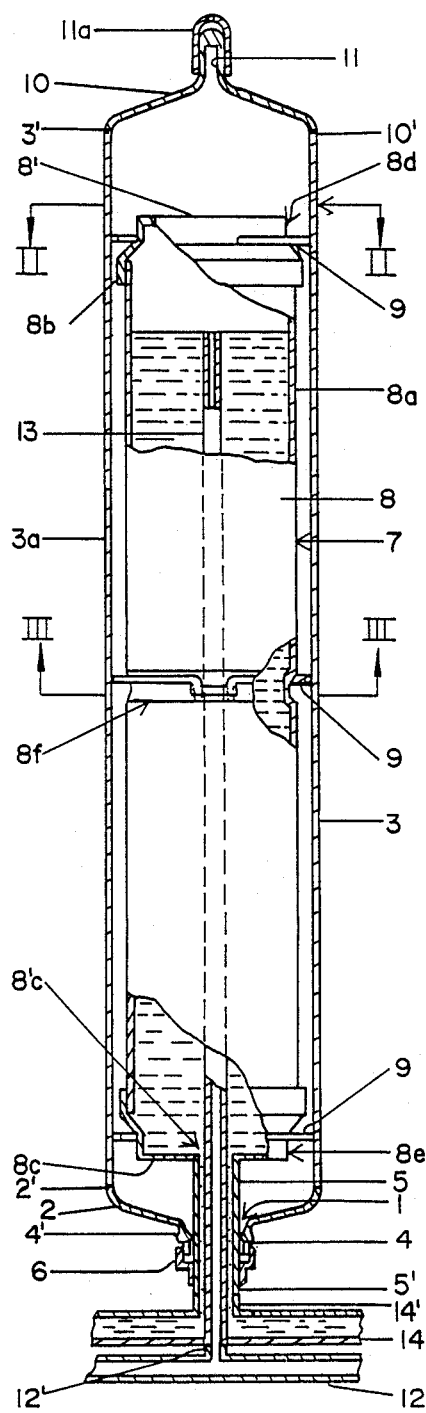
FIG. 1 is a longitudinal cross-sectional view of a vacuum type solar heat collecting apparatus showing a first embodiment in accordance with the present invention.

Hereinafter, description is made on embodiments in accordance with the present invention based on drawings. FIG. 1 is a longitudinal cross-sectional view showing a first embodiment of a vacuum type solar heat collecting apparatus in accordance with the present invention.

An end part 2' of a glass cap 2 having an opening part 1 formed in advance is sealed to a transparent long cylindrical glass pipe 3a by melting to form a glass container 3. For glass material of the glass cap 2, the same material as that of the glass pipe 3a or a material which can be sealed to the glass pipe 3a without trouble suffices. Also, for the glass cap 2, one end of the glass pipe 3a is heated, softened and narrowed in a shape having a vacuum-resisting strength as shown in FIG. 1, or a material which is formed originally in a narrowed shape may be used. Thus, the glass container 3 is obtained wherein the opening part 1 is formed to have a smaller diameter than that of the main body of the glass pipe 3a.

On the other hand, as a preparatory process, an intermediate sealing metal fixture 6 which is the same metal as a second metal pipe 5 or has nearly the same thermal expansion coefficient and excels in anticorrosion is joined (welded or brazed) to one end of a cylindrical glass sealing metal fixture 4 which can be nicely sealed to the glass container 3 covering the outer peripheral of the glass sealing metal fixture 4. For the glass sealing metal fixture, for example, 42% Ni - 6% chromium steel is used in the case where the glass container 3 is of sodium lime glass, and Kovar alloy or the like is used in the case where the container is of borosilica glass. The other end part 4' of the sealing metal fixture 4 is sealed to the opening part 1 of the glass container 3. Needless to say, strains produced in the portions which are glass-sealed, welded or brazed are to be eliminated sufficiently.

Next, the second short pipe 5 is attached to the opening part of small diameter, and a cylindrical water-reservoir 8 composed of metal such as copper, stainless steel or iron whose outer surface is coated with a selective absorption film 7 is inserted into the glass container 3 through the end part 3' of the glass container 3, and an end part 5' of the second part 5 is made to protrude outside the intermediate sealing metal fixture 6, and the second pipe 5 and the intermediate sealing metal fixture 6 are welded or brazed, and futhermore, the water-reservoir 8 is supported in the glass container 3 by the supporters 9 in a fixed and coaxial fashion. The above-mentioned water-reservoir 8 has an outer diameter close to the inner diameter of the glass container 3 and has a large volume occupying at least 60% or more of the inner volume of the glass container 3, and is constituted with a metal cylinder 8a having openings at both ends thereof and metal caps 8b and 8c which are jointed to the both ends of the cylinder 8a, and the selective absorption film 7 is formed by coating on the outer surface of the cylinder 8a or on the outer surface including also the caps 8b and 8c. The cap 8b of the sealed end is formed in a blind lid shape, and is fitted to one end part of the cylinder 8a and the whole periphery thereof is welded or brazed. The cap 8c of the open end side is formed in a cap shape that an opening part 8c' of small diameter is formed at the center part thereof, and is fitted to the other end part of the cylinder and is joined thereto in the manner described above The cylinder 8a and the caps 8b and 8c are made of the same, material, or a different kind of material which has the same or an approximate thermal expansion coefficient and has no trouble joining.

The second short metal pipe 5 is joined to the cap 8c of the open end side. This means that one end of the second pipe 5 is inserted into and fitted to the annular flange part formed at the opening part 8c' of small diameter of the cap 8c, and the whole periphery thereof is welded or brazed.

Outer peripheral parts of small diameter 8d, 8e and 8f are formed at the caps 8b and 8c of the both ends of the water-reservoir 8 and at the center part of the cylinder 8a, and the supporters 9 are attached to these portions.

Figure 2:
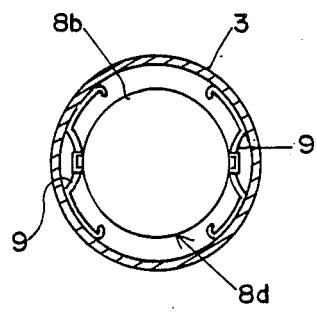
FIG. 2 an FIG. 3 are lateral cross-sectional views taken along a line II—II and a line III—III.
Figure 3:
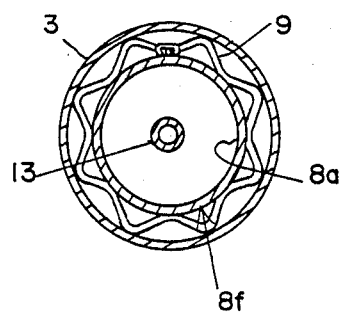

The supporters 9 support the water-reservoir 8 in the glass container 3 in a coaxial fashion while allowing thermal expansion and contraction. In the case with the supporters 9 at the opposite ends as shown in FIG. 2, an elastic metal wire is bent in a proper shape, for example, nearly W-shaped, and four-point in a symmetrical fashion so as not to injure the inner surface of the glass container 3. In the case with the intermediate supporter 9 as shown in FIG. 3, an elastic metal wire is formed in a divided-ring shape, and the contour of the outer periphery thereof is shaped in a manner of bending undulating inward and outward in the radial direction. The portion protruding outward in the radial direction is brought in point-contact with the inner surface of the glass container 3 and the portion depressing inward in the radial direction is brought in point-contact with the outer surface of the water-reservoir 9 and supporting is achieved.

Installing the outer peripheral parts of small diameter 8d, 8e and 8f at the both ends and the center part of the water-reservoir 8 serves to securing a stable support by the supporters 9 in the glass container 3 of the water-reservoir 8 and to increase the volume of water storage of the water-reservoir 8 except for the portions whereto the supporters 9 are attached.

Furthermore, a configuration wherein the water-reservoir 8 is divided into the cylinder 8a and the caps 8b and 8c at opposite ends facilitates the fabrication and reduces the cost.

An end part 10' of a glass cap 10, separately formed of a glass having the same composition as that of the glass container 3, or of a glass which can be sealed by melting to the glass container 3 without trouble is sealed by melting to the end part 3' of the glass container 3. An air evacuating pipe 11 is formed in the glass cap 10 in one piece therewith, and the glass cap 10 is sealed to the glass container 3. An is evacuated through the above-mentioned air evacuating pipe 11, and the space between the glass container 3 and the water-reservoir 8 reaches a predetermined vacuum degree, for example, $10^{-4}$ Torr, forming a vacuum adiabatic layer, and then the air evacuating pipe 11 is closed. In addition, numeral 11a designates a rubber cap for protecting the air evacuating pipe 11.

A first long pipe 13 attached to an end part 12' of a branch pipe of a first header pipe 12 is inserted into the water-reservoir 8 through the second pipe 5 in a manner of extending to the vicinity of the sealed end 8'. End part 5' of the second pipe 5 is connected to an end part 14' of a branch pipe of a second header pipe 14. Connection between the first pipe 13 and the first header pipe 12 and connection between the second pipe 5 and the second header pipe 14 are performed in a replaceable manner by brazing, insertion or use of a connecting fixture.

The glass container 3 and the water-reservoir 8 having the above-mentioned construction are normally installed on the roof of a building or the like with the axial line of cylinder inclined to the horizontal plane by a predetermined angle. In the first embodiment, as shown in FIG. 1, the open ends of the glass container 3 and the water-reservoir 8 are disposed lower than the sealed ends thereof, and water is fed into the water-reservoir 8 from the second header pipe 14 through the second pipe 5. This means that the water fed from the second header pipe 14 flows into the water-reservoir 8 through a gap between the second pipe 5 and the first pipe 13, and is left stored for a certain time until the water is warmed up, thereafter being taken out as hot water from the first pipe 13 through the first header pipe 12. Then, water of an amount equal to the amount of the hot water taken out is fed into the water-reservoir 8 from the second header pipe 14 via the second pipe 5. As to the path for taking out hot water, hot water can be taken out also from the gap between the second pipe 5 and the first pipe 13 through the second header pipe 14 in addition to the above-mentioned path. The first pipe 13 functions as an outlet and inlet of air and a discharging port at overflow besides functioning as an outlet of hot water.

Also, in the above-mentioned description, explanation is made on the example wherein water is left stored in the water-reservoir 8 for a certain time until the water is warmed up, but the present invention is not to be limited to this case, and can be implemented also by the natural circulating system or the forced circulating system.

FIG. 4 is longitudinal cross-sectional view showing a modified example of the first embodiment in accordance with the present invention. The only difference between the first embodiment and this modified example is that in the first embodiment, the second pipe 5 is formed in a larger diameter than that of the first pipe 13, and is disposed in a coaxial fashion with an annular gap installed around the outer periphery of the first pipe 13, while in this modified example, the first pipe 13 and the second pipe 5 are disposed in a parallel fashion. The other configurations and operations are the same as those of the first embodiment, and therefore the description thereon is omitted.

FIG. 5 is a longitudinal cross-sectional view of the vacuum type solar heat collecting apparatus showing a second embodiment in accordance with the present invention.

The above-mentioned second embodiment is the case of installing the first embodiment in upsidedown manner, and the same members as those of the first embodiment are designated by the same numbers.

In the above-mentioned second embodiment, the open ends of the glass container 3 and the water-reservoir 8 are disposed higher than the sealed ends thereof, and water is fed into the water-reservoir 8 from the first pipe 13, and hot water is taken out of the water-reservoir 8 through the second pipe 5. This means that the water fed from the first header pipe 12 flows into the vicinity of the bottom part of the water-reservoir 8 through the first pipe 13 and is left stored in the water-reservoir 8 for a certain time until the water is warmed up, thereafter being taken out of the second pipe 5 via the second header pipe 14. Then, water of an amount equal to that of the hot water taken out is fed into the water-reservoir 8 from header pipe 12 through the first pipe 13. The second pipe 5 and the second header pipe 14 function as outlets and inlets of air an water discharging ports at overflow besides functioning as outlets of hot water.

The above-mentioned description is made on the base of the leave-stored system, and it is apparent that the present invention is applicable also to the natural circulating system and the forced circulating system.

Figure 6:
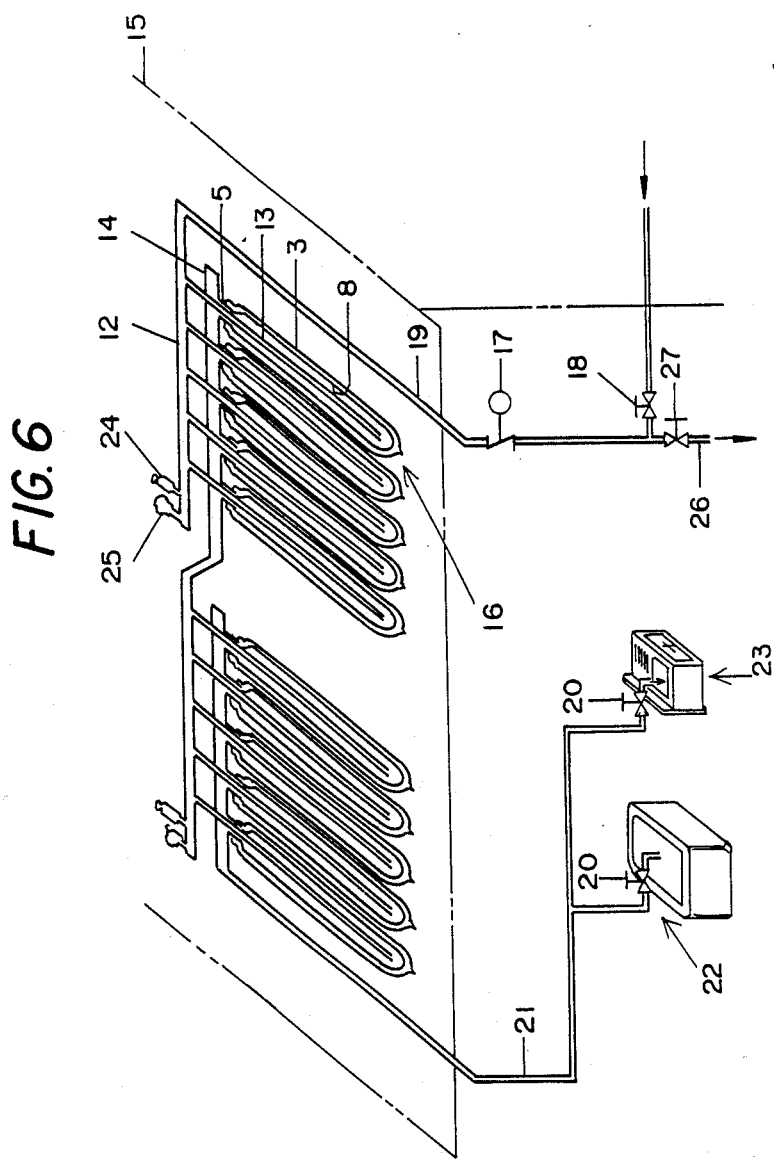
FIG. 6 is a schematic perspective view showing one embodiment of a hot water feeding installation employing the vacuum type solar heat collecting apparatus in accordance with the present invention in a form of unit.

Next, FIG. 6 is a schematic perspective view showing one embodiment of a hot water feeding installation wherein one unit is constituted with one set of five pieces of the above-mentioned vacuum type solar heat collecting apparatus in accordance with the present invention, and two units are connected and installed on the roof 14 of a building.

In FIG. 6, numeral 16 designates a vacuum type solar heat collecting apparatus.

Each vacuum type solar heat collecting apparatus 16 provides the glass container 3 having the water-reservoir 8 therein, the first pipe 13 and the second pipe 5, and each first pipe 13 is connected to the first header pipe 12 in a parallel fashion, and each second pipe 5 is connected to the second header pipe 14 in a parallel fashion.

One set of five pieces of the above-mentioned vacuum type solar heat collecting apparatus 16 constitutes one unit, and is accommodated in a supporting frame in the state that the both header pipes 12 and 14, the sealing metal fixtures 4 and 6 of the open end side of each glass container 3 and the outer end parts of the first pipe 13 and the second pipe 5 are protected by coating a suitable adiabatic material.

The first header pipe 12 is connected to the water feed pressure source such as water service through a water feed pipe 19 having a reduced pressure check valve 17 and a water feed valve 18, and by opening the water feed valve 18, the water pressure from the water feed pressure source such as water service is reduced to an appropriate pressure through the reduced pressure check valve 17, and acts on the whole hot water feeding installation. For example, the water pressure of water service in Japan is maintained at a predetermined value, for example, 3kg/cm$^2$, and this is reduced to and regulated at an appropriate pressure, for example, 0.6kg/cm$^2$ by the reduced pressure check valve 17.

The above-mentioned reduced pressure check valve 17 also prevents hot water from flowing back from the side of the hot water feeding installation of the present invention to the water feed pressure source such as water service.

The second header pipe 14 is connected to a hot water feed pipe 21 having a hot water feed stopcock 20, and by opening the hot water feed stopcock 20, hot water can be taken out by any time.

The hot water feed stopcocks 20 are disposed, for example, in a bath room 22, a kitchen 23 and the like in a branched manner.

FIG. 6 shows the case of connecting two units in series, wherein one unit is constituted with one set of five pieces of the vacuum type solar heat collecting apparatus 16. The number of pieces of the vacuum type solar heat collecting apparatus 16 and the number of units to be used can be increased or decreased freely, being not limited to the illustrated one.

In FIG. 6, numeral 24 designates an automatic air relief valve and numeral 25 designates a safety valve, and these are installed on the first header pipe 12 in the figure, but can be installed also on the second header pipe 14. Furthermore, in FIG. 6, numeral 26 designates a drain pipe and numeral 27 designates a drain valve, and they are installed on intermediate parts of the water feed pipe 19.

The hot water feeding installation in FIG. 6 is constituted as described above, and subsequently the using method is described.

First, the drain valve 27 is closed, and the water feed valve 18 is opened. Thereby, water reaches the first header pipe 12 of the right unit in FIG. 6 from the water feed pipe 19 passing through the reduced pressure check valve 17 by means of the water pressure from the water feed pressure source such as water service, and is distributed to each first pipe 13 from this header pipe 12, being fed to the vicinity of the bottom part of each water-reservoir 8. Air in each water-reservoir 8 passes through the first pipe 13 or the second pipe 5 and then through the header pipe 14, being discharged through the automatic air relief valve 24. At this time, when the hot water feed stopcock 20 is left opened, air is discharged more quickly. Thereby, each water-reservoir 8 of the right unit in FIG. 6 is filled with water, and subsequently water is fed to the first header pipe 12 of the left unit FIG. 6 from the second header pipe 14 of the right unit in FIG. 6, and each water-reservoir 8 of the left unit FIG. 6 is also filled with water likewise, and the hot water feed pipe 21 is also filled with water. In this case, the pressure in the hot water feeding installation in FIG. 6 is kept at a predetermined pressure set by the reduced pressure check valve 17. This state is left intact for a while so that the water in the water-reservoir 8 is warmed up by solar heat. Solar heat is transmitted through the glass container 3 and heats the water-reservoir 8 through the selective absorption film 7, and thereby the temperature of water in each water-reservoir 8 is raised and water makes natural circulation. Thus, the hot water feed stopcock 20 is opened in the state that the water is fully warmed up, and hot water in each water-reservoir 8 is taken out. Then, water of an amount equal to that of hot water taken out is fed into each water-reservoir 8 from the water feed pressure source such as water service. In addition, in FIG. 6, the series connection system is exemplified wherein hot water heated in the right unit is transferred to the left unit to be reheated, but parallel connection of the both units can be performed.

Furthermore, in the vacuum type solar heat collecting apparatus in accordance with the present invention, in addition to parallel connection to the first header pipe and the second header pipe through the first and the second pipes, series connection can be also performed wherein the second pipe of the pre-stage vacuum type solar heat collecting apparatus is connected directly to the first pipe of the adjacent post-stage vacuum type solar heat collecting apparatus without employing the header pipes.

Also, the hot water feeding installation in FIG. 6, may be used in the aspect as shown in FIG. 1 wherein each vacuum type solar heat collecting apparatus 16 is placed upside down.

What is claimed is:

1. A vacuum type solar heat collecting apparatus comprising:
    a transparent long cylindrical glass container, one end of said container is sealed tightly and the other end of said container is open and narrowed into a diameter smaller than the diameter of said container,
    a cylindrical metal water-reservoir, one end of said water-reservoir is sealed tightly and the other end of said water reservoir is open and narrowed into a diameter smaller than the diameter of the water reservoir, said water-reservoir having outer peripheral parts at the opposite ends of said water-reservoir and at an approximate intermediate portion of said water-reservoir with a diameter smaller than the diameter of said water-reservoir, said water-reservoir being disposed in said glass container in a coaxial fashion with said glass container by supporters in said outer peripheral parts with smaller diameter, the outer surface of said water-reservoir being coated with a selective absorption film, said cylindrical metal water-reservoir having an outer diameter, except at said outer peripheral parts at the opposite ends and at said approximate intermediate portion of said cylindrical metal water-reservoir, only slightly less than the inner diameter of said cylindrical glass container, said cylindrical metal water-reservoir occupying not less that 60% of the inner volume of said cylindrical glass container,
    a first long pipe inserted into said water-reservoir with an end of said first long pipe in the vicinity of the sealed end of said water-reservoir, said first long pipe extending through said open ends of said glass container and said water-reservoir,
    a second short pipe having a first end connected to the open end of said water-reservoir, said second short pipe extending through the open end of said glass container, and
    a sealed metal fixture sealing the open end of small diameter of said glass container with said first long pipe and said second short pipe passing through said metal fixture,
    wherein space between said glass container and water-reservoir is kept in vacuum, and water is fed into said water-reservoir through either of said first pipe and said second pipe, and is stored and collects heat in said water-reservoir, and hot water is removed from said water-reservoir,
    said water-reservoir comprising a metal cylinder having open ends at the opposite ends of said metal cylinder and having a uniform diameter except for the intermediate portion where at least one of said supporters is attached and where metal caps defined in part said outer peripheral parts and are joined to the opposite ends of said cylinder.

2. A vacuum type solar heat collector apparatus in accordance with claim 1, wherein said open ends of said glass container and said water-reservoir are disposed lower than said sealed ends of said glass container and said water-reservoir, and water is fed into said water-reservoir through said second pipe, and hot water is taken out of said water-reservoir through one of said first pipe and said second pipe.

3. A vacuum type solar heat collecting apparatus in accordance with claim 1, wherein said open ends of said glass container and said water-reservoir are disposed higher than the sealed ends of said glass container and said water-reservoir, and water is fed into said water-reservoir through said first pipe, and hot water is taken out of said water-reservoir through said second pipe.

4. A vacuum type solar heat collecting apparatus in accordance with any one of claim 1 through claim 3, wherein the diameter of said second pipe is larger than the diameter of said first pipe and provides a gap around the outer periphery of said first pipe and said pipes are coaxially disposed.

5. A vacuum type solar heat collecting apparatus in accordance with any one of claim 1 through claim 3, wherein said first pipe and said second pipe are disposed parallel to each other.

6. A vacuum type solar heat collecting apparatus in accordance with any one of claim 1 through claim 3, wherein a plurality of glass containers each having a water-reservoir therein are employed, and are connected to a first header pipe and a second pipe through said first pipe and said second pipe respectively in a parallel fashion.

7. A vacuum type solar heat collecting apparatus in accordance with claim 6, wherein the header pipe of the water feed side is connected directly to a water feed through a water feed pressure source through a reduced pressure check valve, and the header pipe for taking out hot water is connected to a hot water feed pipe having a hot water feed stopcock.

* * * * *